(No Model.)
M. GOTTFRIED.
APPARATUS FOR COOLING BEER IN FERMENTING TUBS.
No. 357,196. Patented Feb. 8, 1887.
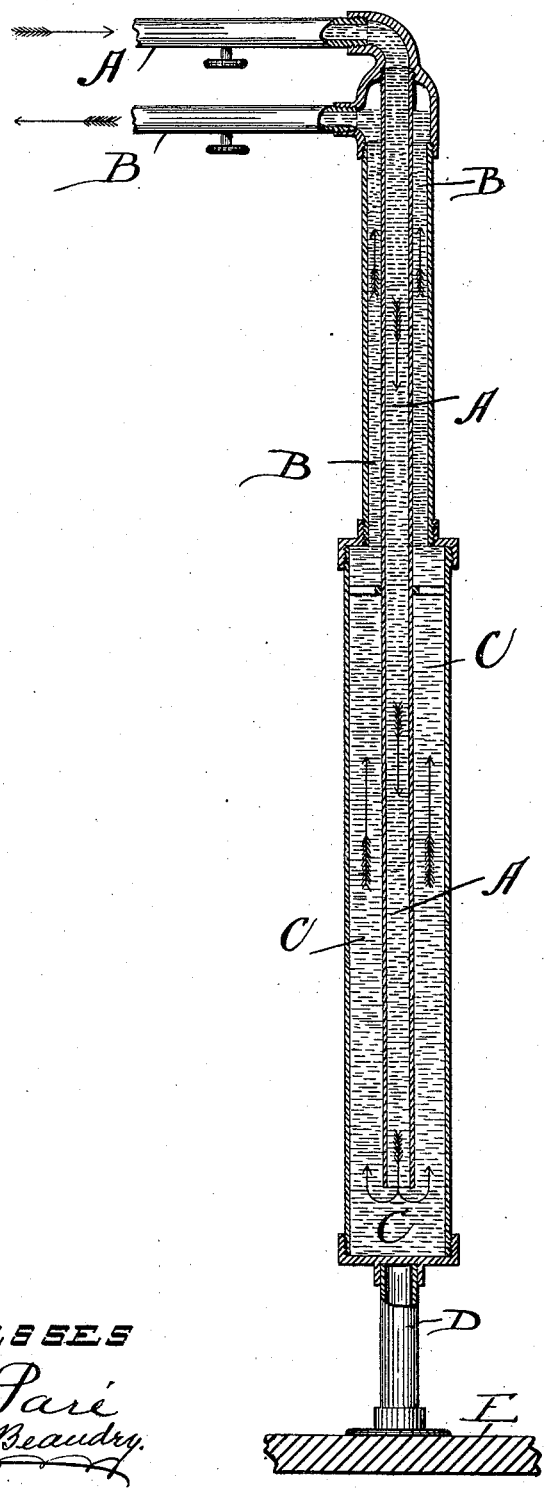

UNITED STATES PATENT OFFICE.

MATHEUS GOTTFRIED, OF CHICAGO, ILLINOIS.

APPARATUS FOR COOLING BEER IN FERMENTING-TUBS.

SPECIFICATION forming part of Letters Patent No. 357,196, dated February 8, 1887.

Application filed March 6, 1886. Serial No. 194,250. (No model.)

*To all whom it may concern:*

Be it known that I, MATHEUS GOTTFRIED, a citizen of the United States, residing at Chicago, Illinois, have invented a new and useful Improvement in Apparatus for Cooling Beer in Fermenting-Tubs, of which the following is a specification.

In the accompanying drawing, A represents the inlet-pipe for the ice-water or brine to be used in cooling beer while in the process of fermentation; B, the outlet-pipe therefor; C, the cooling-cylinder, and D the support for such cylinder placed centrally on the bottom E of the fermenting-tub.

This invention is an improvement upon the one described in my patent of February 6, 1877, No. 187,128, and differs therefrom particularly in that, having no loose joints, it is capable of standing any pressure required, no matter how great, in the refrigerating process, and in that, not having any part passing through the bottom of the tub, it is more convenient for putting in and use.

The inlet-pipe is nearly as long as the outlet-pipe and cooling-cylinder together, and, being of much smaller diameter, passes down therein to near the bottom of the cylinder. The beer being in process of fermentation in the tubs, the ice-water or brine is permitted to flow in through the inlet-pipe and down to the lower end thereof, as indicated by the inwardly and downwardly pointed arrows, and it then escapes and passes into the cooling-cylinder, and immediately rises therein and in the outlet-pipe until it reaches the point of overflow, as indicated by the upwardly and outwardly pointed arrows. The cooling-cylinder being much larger than the outlet-pipes, according to the size of the fermenting-tub, the volume of the outflowing brine or water is diminished and its speed proportionately increased as soon as it leaves the cylinder and enters the outlet-pipe proper. The water or brine thus returned is of course carried back to the brine or ice-water tank, where it again passes through the refrigerating process, and is thus made ready for use a second time, and so on continually.

The cooling of the beer is caused by the ice-water or brine in the cooling-cylinder, the outside surfaces of which are of course entirely surrounded by the fermenting beer. The support for the cooling-cylinder being placed centrally in the bottom of the fermenting-tub, of course holds the cylinder centrally above it, and thus causes the cooling of the beer to be from the center outwardly. In thus speaking of the "cooling" of the beer, I of course use the term as commonly understood by brewers in this connection as meaning rather the preventing of the generation of heat by fermentation.

As already stated, all the joints are made steam-tight, and this enables the apparatus to be used under any pressure that may be desired, even in the improved refrigerating processes now commonly carried on in breweries.

The tightness of all the joints of course prevents leakage, and this, with the simplicity of the whole apparatus, gives it a decided advantage over every other cooling device now in common use.

I claim—

1. The combination, with a fermenting-tub, of a cooling-cylinder, an inlet-pipe extending down inside the cylinder to near the bottom thereof, an outlet-pipe surrounding the inlet-pipe above the cylinder, and a support for the whole placed on the bottom of and inside the tub, substantially as described.

2. The combination, with a fermenting-tub, of a cooling-cylinder, an inlet-pipe extending down inside the cylinder to near the bottom thereof, and an outlet-pipe surrounding the inlet-pipe above the cylinder, the cylinder and pipes having all their joints hermetically sealed to prevent the escape of the brine or ice-water, substantially as described.

MATHEUS GOTTFRIED.

Witnesses:
EPHRAIM BANNING,
E. F. HUBBARD.